United States Patent [19]
Cowsert

[11] Patent Number: 5,829,820
[45] Date of Patent: *Nov. 3, 1998

[54] CONVERTIBLE TOP COVERING RETAINER WITH METHOD FOR USING THE SAME

[75] Inventor: Lendell E. Cowsert, Taylor, Mich.

[73] Assignee: ASC Incorporated, Southgate, Mich.

[ * ] Notice: This patent issued on a continued prosecution application filed under 37 CFR 1.53(d), and is subject to the twenty year patent term provisions of 35 U.S.C. 154(a)(2).

[21] Appl. No.: 747,149

[22] Filed: Nov. 8, 1996

Related U.S. Application Data

[63] Continuation of Ser. No. 681,655, Jul. 29, 1996, abandoned, which is a continuation of Ser. No. 318,852, filed as PCT/US92/03081, Apr. 15, 1992, Pat. No. 5,540,476, which is a continuation of Ser. No. 680,371, Apr. 4, 1991, abandoned.

[51] Int. Cl.$^6$ ........................................................ B60J 7/08
[52] U.S. Cl. .................. 296/107.11; 296/118; 296/107.7
[58] Field of Search ..................... 296/104, 107, 296/118, 121, 136, 146.14, 145, 147, 201, 214; 160/395, 392, 398; 24/461, 462, 625

[56] References Cited

U.S. PATENT DOCUMENTS

| | | | |
|---|---|---|---|
| 1,340,307 | 5/1920 | Vetter ....................................... | 296/118 |
| 2,036,390 | 4/1936 | Bowers ..................................... | 296/214 |
| 2,042,431 | 5/1936 | Hooper ..................................... | 296/214 |
| 2,213,912 | 9/1940 | Hooper ..................................... | 160/395 |
| 2,526,912 | 10/1950 | Swanson ............................. | 160/392 X |
| 2,556,565 | 6/1951 | Votypka ............................. | 160/392 X |
| 2,560,493 | 7/1951 | Spring ..................................... | 296/145 |
| 2,580,337 | 12/1951 | Votypka ................................... | 296/107 |
| 2,708,137 | 5/1955 | Poelman ................................. | 296/107 |
| 3,090,646 | 5/1963 | Johnson .................................. | 296/107 |
| 3,237,983 | 3/1966 | Hollar, Jr. ............................... | 296/107 |
| 3,774,959 | 11/1973 | Brody ..................................... | 296/121 |
| 3,837,984 | 9/1974 | Wagner et al. ........................ | 425/65 X |
| 3,875,623 | 4/1975 | Johnston .............................. | 160/392 X |
| 3,953,067 | 4/1976 | Isola ....................................... | 296/214 |
| 4,170,810 | 10/1979 | Pelgg ......................................... | 24/462 |
| 4,626,021 | 12/1986 | Muscat ................................... | 296/107 |
| 4,746,163 | 5/1988 | Muscat ............................... | 296/107 X |
| 4,902,068 | 2/1990 | Dowd et al. ........................... | 296/214 |
| 4,991,902 | 2/1991 | Schrader et al. ....................... | 296/107 |
| 4,998,766 | 3/1991 | Biermacher et al. .................. | 296/136 |
| 5,511,844 | 4/1996 | Boardman . | |
| 5,540,476 | 7/1996 | Cowsart .................................. | 296/107 |

FOREIGN PATENT DOCUMENTS

| | | | |
|---|---|---|---|
| 0248240 | 12/1987 | European Pat. Off. ............... | 296/214 |
| 0284931 | 10/1988 | European Pat. Off. ............... | 296/107 |
| 0294254 | 12/1988 | European Pat. Off. ............... | 296/201 |
| 35 27 541 A1 | 2/1987 | Germany . | |
| 3606165 | 8/1987 | Germany ............................... | 296/118 |
| 656225 | 8/1951 | United Kingdom .................. | 269/116 |
| 751462 | 6/1956 | United Kingdom .................. | 296/118 |
| 821311 | 10/1959 | United Kingdom .................. | 296/118 |
| 951534 | 3/1964 | United Kingdom .................. | 296/107 |
| 1057247 | 2/1967 | United Kingdom . | |

OTHER PUBLICATIONS

Drawing of General Motors Headliner (prior to Jun. 1, 1988).

Primary Examiner—Dennis H. Pedder
Attorney, Agent, or Firm—Harness, Dickey & Pierce, P.L.C.

[57] ABSTRACT

A convertible top having improved supporting means (16, 36, 46, 50, 56 and 58) for securing pliable covering (10, 12, and 14) to the linkage assembly. The means for securing the pliable covering (10, 12 and 14) includes one or more grooves (18, 20 and 22) on the supporting means (16, 36, 46, 50, 56 and 58) and attaching means (24, 26, 28) on the pliable covering (10, 12 and 14) which engages a groove (18, 20 or 22) in the supporting means (16, 36, 46, 50, 56 and 58) to secure the pliable covering (10, 12 and 14) in place. A method of assembly is also disclosed.

16 Claims, 3 Drawing Sheets

CONVERTIBLE TOP COVERING RETAINER WITH METHOD FOR USING THE SAME

This is a continuation of U.S. patent application Ser. No. 08/681,655, filed Jul. 29, 1996, now abandoned which is a continuation of U.S. patent application Ser. No. 08/318,852, filed Dec. 29, 1994, now U.S. Pat. No. 5,540,476 which is a continuation of PCT/US92/03081 filed Apr. 15, 1992, designating the United States, which is a continuation of U.S. patent application Ser. No. 07/680,371, filed Apr. 4, 1991, now abandoned.

BACKGROUND AND SUMMARY OF THE INVENTION

The present invention relates generally to automobile convertible tops, and more particularly to an improved technique for attaching pliable coverings to the convertible top linkage assembly.

The present invention is well suited for convertible vehicles utilizing pliable coverings such as convertible top covers, headliners, and backlights. One common way that pliable coverings are attached to a linkage assembly is by stapling them to tack strips which are in turn fastened to the linkage assembly. Once the tack strip is attached to the linkage assembly, the staples holding the covering to the tack strip are exposed and must be covered. Accordingly, trim members are fastened to the convertible top such that the entire length of the tack strip seam is covered, however, the trim member itself protrudes above the convertible top surface and is itself a variance from the desirable smooth outer surface.

Proper installation of such a trim member involves matching the trim member with the top covering, fastening it to the linkage assembly such that it covers the tack strip seam and seats properly upon the convertible top, and finally placing end caps over the ends of the trim member to hide fasteners which hold the trim member in place. Consequently, existing methods for attaching pliable coverings require a multitude of parts, each requiring precise positioning to achieve the desirable esthetic appearance. Thus, assembly of these parts requires considerable man hours, and the removal and replacement of a damaged or defective covering requires additional man hours.

The present invention utilizes a novel bow within a convertible top linkage assembly that has a unique elongated supporting means. This elongated supporting means comprises keyhole type grooves which correspond to welts that extend from the edges of the pliable coverings. The welts slidingly engage with the grooves such that the welt is disposed longitudinally within the groove in a dovetail fashion. As a result, a seamless connection between the coverings and the linkage assembly is achieved and the welt can only be removed by sliding the covering in a direction parallel to the groove. Accordingly, the covering is securely retained and an unsightly seam that utilizes conventional fasteners is avoided. Furthermore, the time to assemble a convertible top utilizing the present invention is significantly reduced, as is the time to remove and replace damaged convertible top coverings.

Additional advantages and features of the present invention will become apparent from the subsequent description and the claims taken in conjunction with the accompanying drawings.

DESCRIPTION OF THE PREFERRED EMBODIMENT

Figure 1:
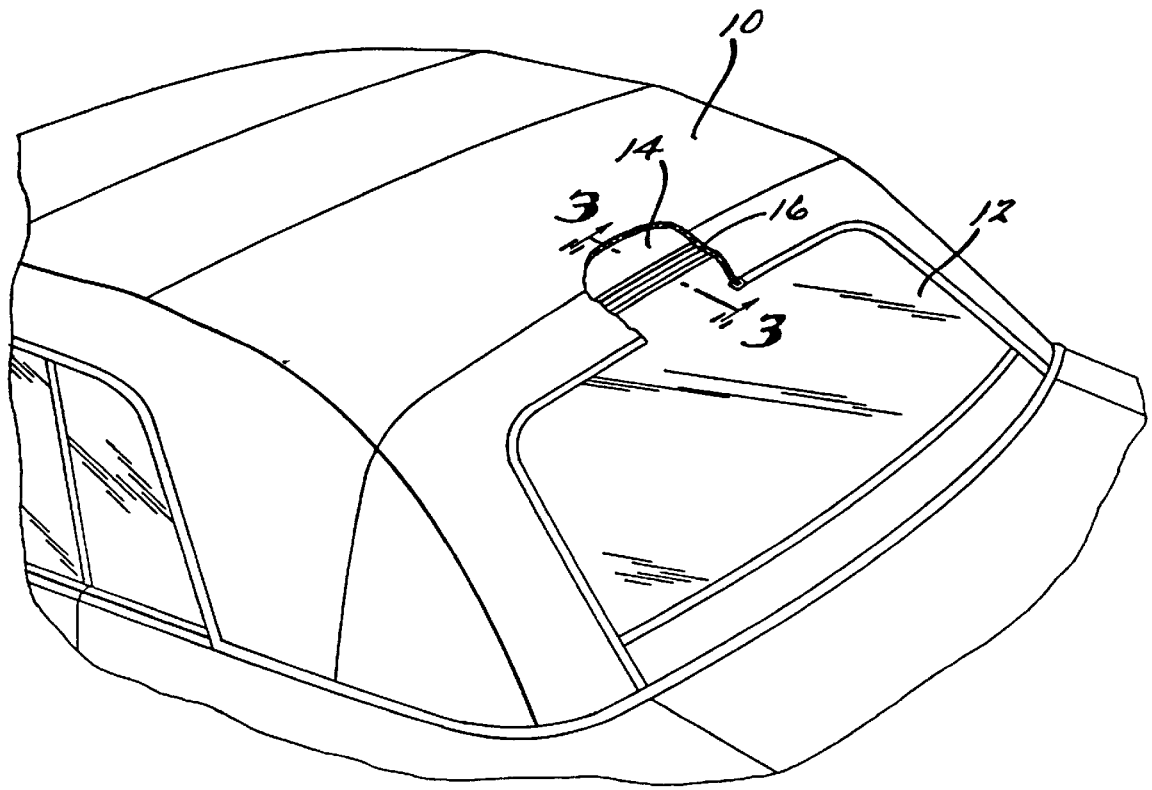
FIG. 1 is a perspective view showing a typical convertible top with the convertible top cover, the backlight and the headliner attached in accordance with the principles of the present invention.
Figure 2:
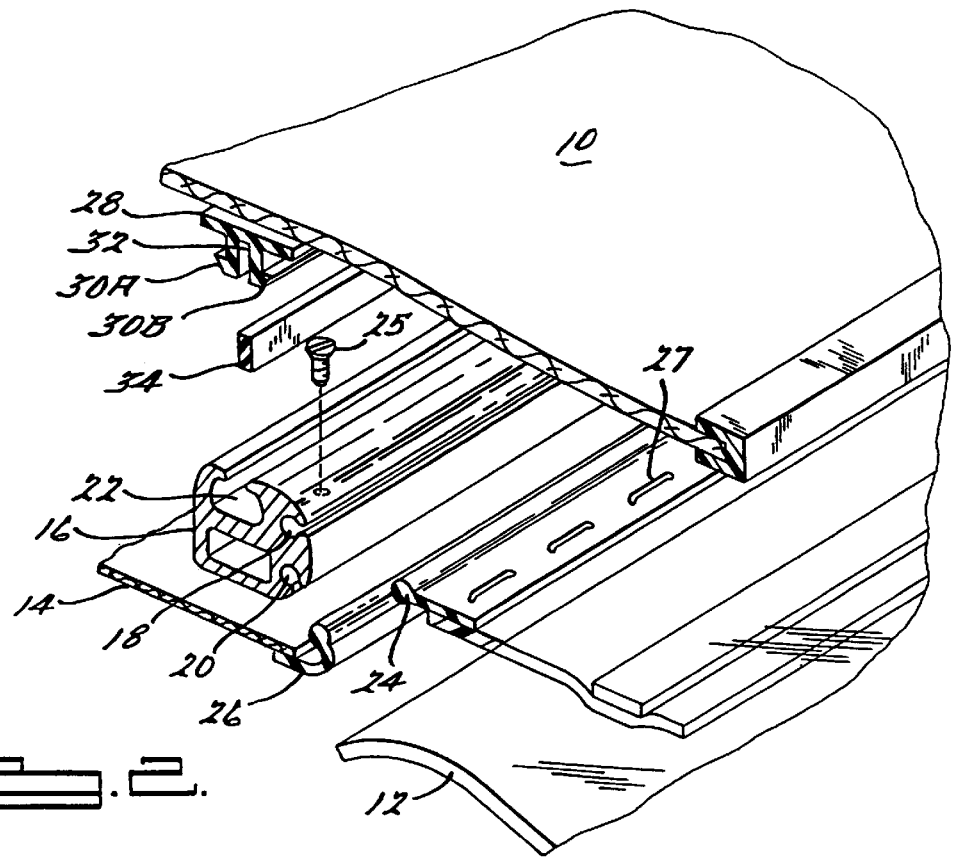
FIG. 2 is an exploded perspective view showing how the convertible top cover, the backlight and the headliner are interconnected by the supporting means of the present invention.
Figure 3:
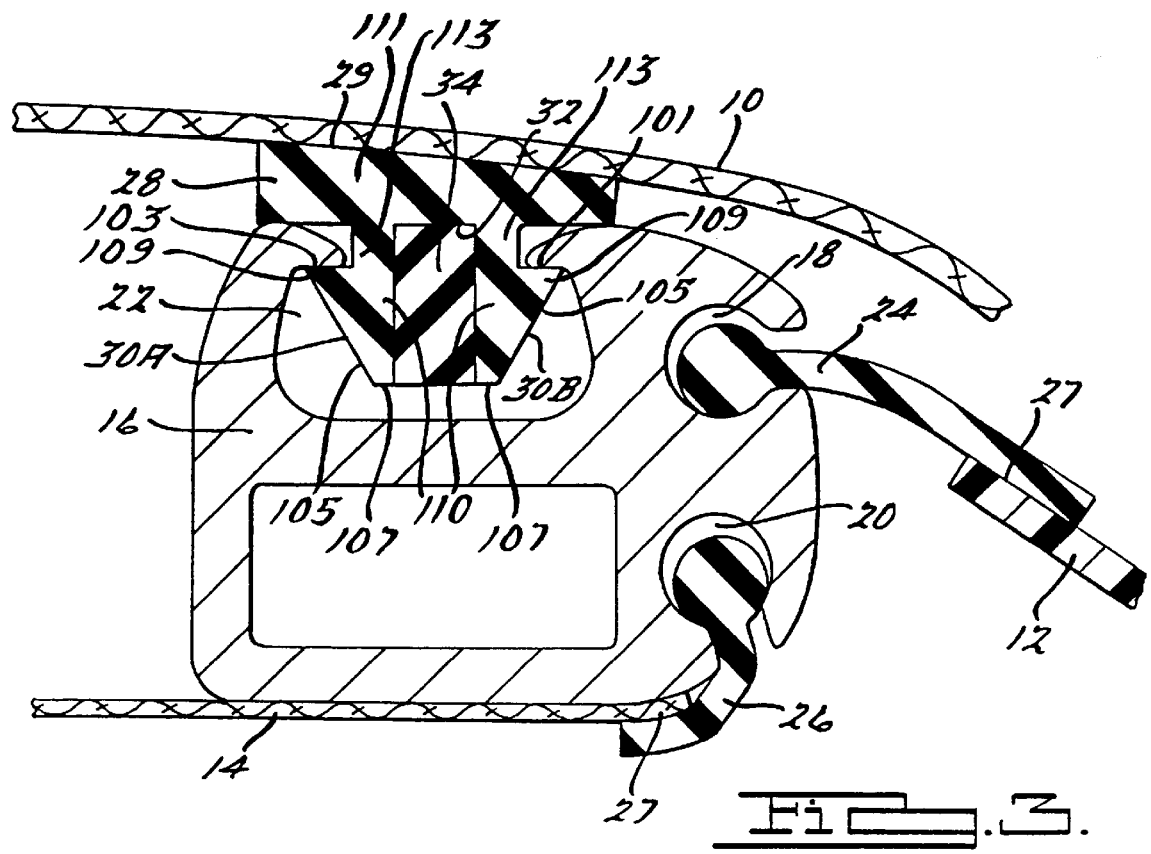
FIG. 3 is a cross sectional view of the supporting means of the present invention taken along line 3—3 in FIG. 1 showing the convertible top cover, the backlight, and the headliner engaged with the grooves in the supporting means in accordance with the principles of the present invention.

Referring now to the drawings, particularly to FIGS. 1–3, the seamless attachment of a convertible top cover 10, a flexible plastic backlight 12 and a headliner 14 to a typical linkage assembly (not shown) is accomplished by utilizing a novel bow member 16 having unique grooved supporting means. Typically, the sole function of a bow member is to support the convertible top cover 10 and the headliner 14, however, the bow member 16 of the present invention additionally provides grooves for attaching pliable coverings directly to the linkage assembly without using conventional fastening means. Furthermore, this bow member 16 can be designed to either replace a conventional bow or to be attached to an existing bow.

The bow member 16 of the present invention is preferably extruded from aluminum, however, it may also be made from other materials such as a fiber reinforced plastic material. FIGS. 2 and 3 illustrate such a bow member 16 having three grooves in accordance with the present invention. These three grooves 18, 20 and 22 are designed to individually retain corresponding attaching means that extend from the pliable coverings and engage with the grooves 18, 20 and 22. The two attaching means used to attach the backlight 12 and the headliner 14 to the bow member 16 are key-hole shaped welts 24 and 26. These key-hole shaped welts 24 and 26 are sewn with heavy stitching 27 to the edges of the backlight 12 and the headliner 14 as illustrated in FIG. 2. Note that these key-hole shaped welts 24 and 26 can be an integral portion of the backlight 12 and the headliner 14 (not shown). The welts 24 and 26 slidingly engage with the corresponding grooves 18 and 20, and by virtue of their key-hole engagement cannot be transversely disengaged from the grooves 18 and 20. To prevent the welts 24 and 26 from longitudinally disengaging from the keyhole grooves 18 and 20, small screws 25 pass through the bow member 16 and individually engage with one of the welts 24 and 26.

The other attaching means shown in FIGS. 2 and 3 is an elongated barbed member 28 which is used to attach the top cover 10 to the bow member 16. This barbed member 28 is attached to an intermediate portion of the interior surface of the convertible top cover 10 by die electric bonding 29 and reinforced by heavy stitching (not shown), however, other means such as an adhesive may be utilized. Moreover, as with the backlight 12 and the headliner 14, the barbed member 28 can integrally extend from the top cover 10. The elongated barbed member 28 has two symmetrical barbed portions 30A and 30B that extend downward from the body of the member 28. These barbed portions 30A and 30B are inserted downwardly into the corresponding groove 22 across the entire length of the barbed member 28 until the entire barbed member 28 engages with the groove 22 as shown in FIG. 3. Note that the two barbed portions 30A and 30B form a slot 32 that traverses the entire length of the barbed member 28. This slot 32 provides the necessary relief that allows the barbed portions 30A and 30B to be inserted into the groove 22. To insure that the elongated barbed member 28 does not inadvertently deflect and disengage from the groove 22, an elongated rectangular strip 34 is slidingly engaged into the slot 32.

The elongated barbed member 28 further has first and second undercut grooves 101 and 103, respectively. A substantially flat surface 105 is outwardly angled from a distal tip 107 to an enlarged portion 109 of each barbed portion 110. Thus, the leading flat surfaces 105 are inwardly angled toward each other at an end substantially opposite from a base 111. The base 111 contacts against an upper surface of the bow member 16 opposite from the undercut grooves 101 and 103. Two intermediate walls 113 project substantially perpendicular from the base 111 and the barbed portions 110 depend from the corresponding intermediate walls 113. Channel engaging portions of each barbed portion 110 are disposed outward farther than the corresponding distal end or tip 107 while the flat surface of the base 111 contacts against the external surface of the bow member 16. Furthermore, bow member 16 has differing thicknesses and at least two substantially flat external surfaces.

Figure 4:
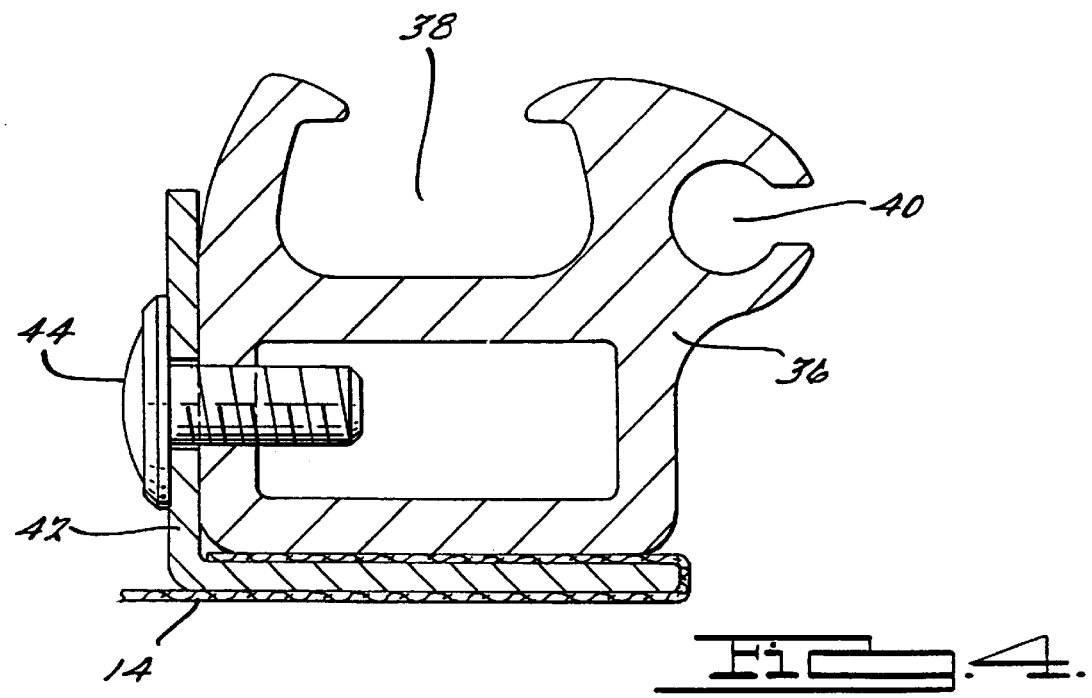
FIG. 4 is a cross sectional view similar to FIG. 3 showing an alternative supporting means in accordance with the present invention with two grooves for engagement with attaching means that extend from the convertible top cover and the backlight, in combination with a conventional headliner retainer for holding the headliner in place.
Figure 5:
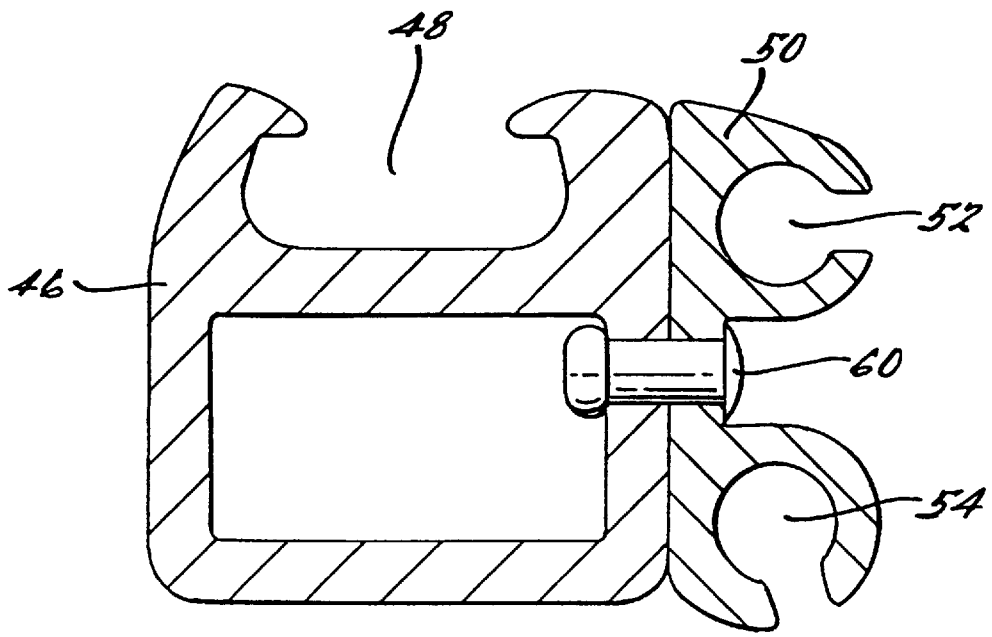
FIG. 5 is a cross sectional view similar to FIG. 3 showing another alternative supporting means in accordance with the present invention having a grooved member, with two grooves for engagement with attaching means that extend from the backlight and the headliner, riveted to a bow member having one groove for engagement with attaching means extending from the convertible top cover.
Figure 6:
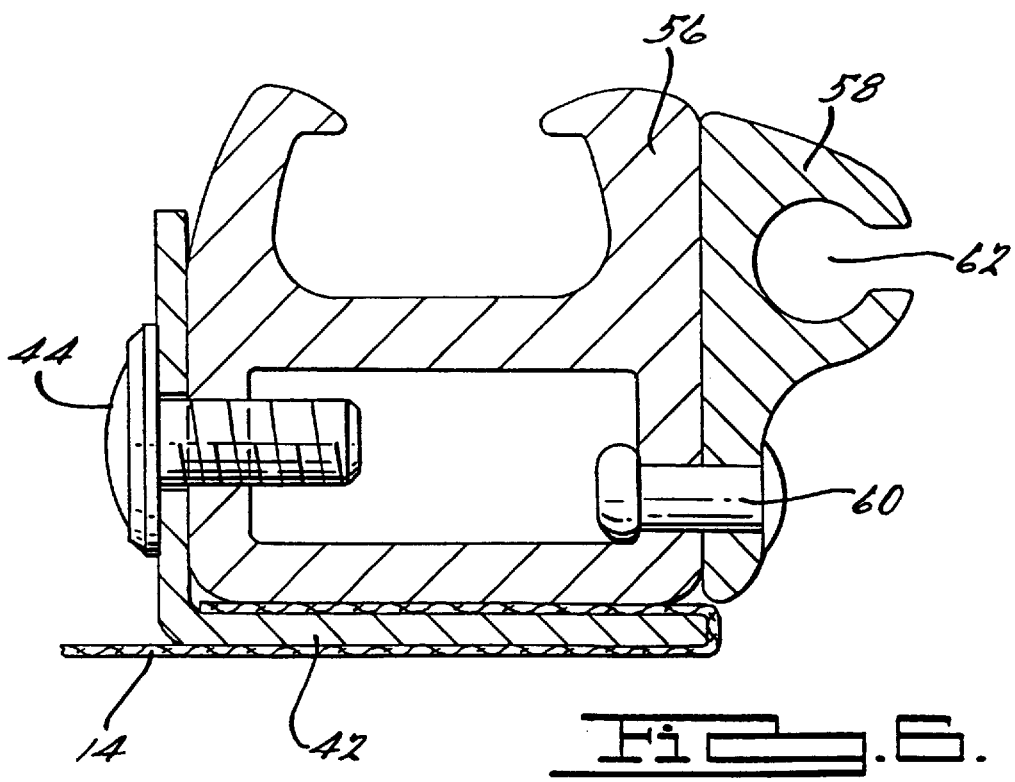
FIG. 6 is a cross sectional view similar to FIG. 3 showing yet another alternative supporting means in accordance with the present invention having a grooved member, with one groove for engagement with attaching means extending from the backlight, riveted to a bow member having one groove for engagement with attaching means extending from the convertible top cover, along with a conventional headliner retainer attached to the bow member for holding the headliner in place.

FIGS. 4–6 are similar to FIG. 3 and illustrate three alternate embodiments of the present invention. The embodiment depicted in FIG. 4 is a bow member 36 that has only two grooves 38 and 40; one groove 38 corresponds to an elongated barbed member 28 that extends from the top cover 10, and the second groove 40 corresponds to a keyhole shaped welt 24 that extends from the backlight 12. Unlike the previous embodiment, the headliner 14 is attached to this bow member 36 by a conventional headliner retainer 42 that is detachably affixed to the bow member 36 with threaded fasteners 44.

The embodiment depicted in FIG. 5 utilizes a bow member 46 having one groove 48 that corresponds to an elongated barbed member 28. In addition, a grooved member 50 having two grooves 52 and 54 is detachably affixed to the bow member 46 by rivets 60 or the like for supporting the backlight 12 and the headliner 14. These grooves 52 and 54 are keyhole shaped for engagement with correspondingly shaped welts 24 and 26 as discussed above.

The embodiment depicted in FIG. 6 also utilizes a bow member 56 very similar to the one depicted in FIG. 5, however, the headliner 14 is attached to this bow member 56 with a conventional headliner retainer 42 that is detachably affixed to the bow member 56 using threaded fasteners 44. Furthermore, the backlight 12 is supported by a grooved member 58 that is detachably affixed to the bow member 56 using rivets 60 or the like. This grooved member 58 has one keyhole shaped groove 62 for engagement with a correspondingly shaped welt 26 that extends from the backlight 12 as discussed previously.

Although the invention has been described and illustrated in connection with certain preferred embodiments there are many variations and modifications that can be effected within the spirit and scope of invention, therefore the invention as set forth in the following claims is not to be limited to the precise details of construction set forth above.

We claim:

1. A convertible top having a pliable roof, said convertible top comprising:

(a) elongated supporting means for supporting said pliable roof;

(b) at least a first undercut groove extending along an upper surface of said elongated supporting means, at least a second undercut groove extending along a substantially rearwardly facing surface of said elongated supporting means; and (c) an elongated attachment member extending from said pliable roof and having barbs disposed in said first groove, a substantially flat surface outwardly angled from a distal tip of said attachment member to an enlarged portion of one of said barbs.

2. A convertible top for an automobile comprising:

a set of movable roof bows each having at least two transverse channels;

a first attachment strip having an enlarged end inserted within a first of said channels;

a back window affixed to said first attachment strip;

a second attachment strip having barbs engaging in a second of said channels;

a roof panel affixed to said second attachment strip;

a third attachment strip having an enlarged end inserted within a third channel of at least one of said set of roof bows, said third attachment strip being formed as a single-piece part; and a headliner affixed to said third attachment strip.

3. An apparatus for securing a pliable cover to a convertible vehicle, said apparatus comprising a roof bow having an enclosed internal cavity accessible by an undercut channel, a pair of barbs on an attachment member having angled leading surfaces and engaging in said undercut channel, a base of said attachment member fastened to said cover, said leading surfaces being inwardly angled toward each other at an end of said attachment member substantially opposite from said base and said leading surfaces being substantially surrounded by said roof bow while in said cavity.

4. The convertible top of claim 1 further comprising a base of said attachment member affixed to said roof, a width of said base being greater than an adjacent width of said barbs in a fore-and-aft direction of said convertible top.

5. The convertible top of claim 4 further comprising a flat surface of said base contacting against said upper surface of said supporting means opposite said first undercut groove.

6. The convertible top of claim 1 wherein said supporting means is an extruded aluminum member having portions of differing thicknesses and having at least two substantially flat external surfaces.

7. The convertible top of claim 1 wherein said supporting means is a movable roof bow.

8. The apparatus of claim 3 further comprising a flat surface of said base contacting against an external surface of said roof bow opposite said undercut channel.

9. The apparatus of claim 3 wherein said roof bow is an extruded aluminum member having portions of differing thicknesses and having at least substantially flat external surfaces.

10. A convertible roof assembly for an automotive vehicle, said convertible roof assembly comprising:

a roof;

a movable roof bow having a top external surface, an undercut channel in said roof bow being accessible from said top external surface; and an attachment member having a base affixed to said roof, an intermediate wall projecting substantially perpendicularly from said base, a barb on said attachment member depending from said intermediate wall, a channel engaging portion on said barb disposed outwardly from said intermediate wall farther than a distal end of said barb, said distal end of said barb being disposed at an opposite end of said attachment member than said base, a substantially flat surface extending between said channel engaging portion and said distal end of said barb, said attachment member securing said roof to said roof bow.

11. The convertible roof assembly of claim 10 further comprising a flat surface of said base contacting against said external surface of said roof bow.

12. The convertible roof assembly of claim 10 wherein a width of said base is larger than an adjacent width of said channel engaging portion of said barb.

13. The convertible roof assembly of claim 10 further comprising a second barb of said attachment member, said barbs being in mirrored symmetry to each other.

14. The convertible roof assembly of claim 10 further comprising a bottom external surface of said roof bow being substantially flat and said top external surface of said roof bow being curved, said roof bow being extruded.

15. The apparatus of claim 3 further comprising a second attachment member located in a second internal cavity of said roof bow, a window affixed to said second attachment member.

16. The apparatus of claim 3 wherein said cover is a convertible roof.

\* \* \* \* \*

UNITED STATES PATENT AND TRADEMARK OFFICE
CERTIFICATE OF CORRECTION

PATENT NO. : 5,829,820
DATED : November 3, 1998
INVENTOR(S) : Lendell E. Cowsert It is certified that error appears in the above-indentified patent and that said Letters Patent is hereby corrected as shown below:

On the Title Page insert the following heading and information -- Notice: The term of this patent shall not extend beyond the expiration date of Pat. No. 5,540,476 --.

On the Title Page under Related U.S. Application Data, line 2, after "318,852," insert -- Pat. No. 5,540,476 which is a continuation of --.

On the Title Page under Related U.S. Application Data, line 2, delete "filed as".

On the Title Page under Related U.S. Application Data, line 3, delete "Pat. No. 5,540,476".

On the Title Page under U.S. Patent Documents, reference 5,540,476 "Cowsart" should be -- Cowsert --.

Column 5, line 8, after "least" insert -- two --.

Signed and Sealed this

Eighteenth Day of May, 1999

Attest:

Attesting Officer

Q. TODD DICKINSON

Acting Commissioner of Patents and Trademarks